United States Patent

[11] 3,603,923

[72] Inventor William B. Nelligan
 Danbury, Conn.
[21] Appl. No. 758,717
[22] Filed Sept. 10, 1968
[45] Patented Sept. 7, 1971
[73] Assignee Schlumberger Technology Corporation
 New York, N.Y.

[54] SIGNALING SYSTEM
 9 Claims, 9 Drawing Figs.
[52] U.S. Cl. .................................................. 340/18,
 179/15, 340/203
[51] Int. Cl. .................................................. H04j 3/02
[50] Field of Search .......................................... 340/18, 18
 P, 18 CM, 203; 179/15 A, 15 BA, 15 BW;
 250/83.6 W

[56] References Cited
UNITED STATES PATENTS
3,159,720 12/1964 Bergmonn et al. ............. 179/15 X Primary Examiner—Rodney D. Bennett, Jr.
Assistant Examiner—Daniel C. Kaufman
Attorneys—William R. Sherman, Richard E. Bee, Donald H. Fidler, Stewart F. Moore and John P. Sinnott ABSTRACT: In one illustrative embodiment of the invention, an armored multiconductor cable connects an array of transformers and gate circuits in a borehole logging tool with a similar array at the earth's surface. The downhole gates are enabled in a predetermined order to transmit sequential portions of a logging signal to the surface. A downhole logic circuit applies the successive signal portions to the cable conductors in a series of conductors potential combinations, or modes. The mode signals enable respective gates at the earth's surface to produce a sequence of pulses that corresponds to the original signal.

COMPOSITOR FOR TWO MODES
(IN PANEL)

MULTIPLEXER FOR TWO MODES
(IN SONDE)

FIG. 1
MODE M₁

FIG. 2
MODE M₂

FIG. 3

COMPOSITOR FOR TWO MODES
(IN PANEL)

MULTIPLEXER FOR TWO MODES
(IN SONDE)

INVENTOR.
William B. Nelligan
BY John P. Sinnott
ATTORNEY

FIG. 4

FIG.5
MODE $M_3$ TRANSMISSION

SIGNALING SYSTEM

BACKGROUND OF THE INVENTION

1. Field of the Invention

This invention relates to signal transmission techniques and, more particularly, to apparatus for transmitting signals to the earth's surface from borehole logging tools, and the like.

2. Description of the Prior Art

Oil production zones in the earth formations surrounding a borehole often are identified through "radioactivity logging." These logging techniques usually involve drawing a well logging tool or sonde through the borehole. A radioactive source within the moving sonde emits radiations, such as neutrons or gamma rays, some of which diffuse through the formation in question. Frequently, the irradiating neutrons react with formation nuclei to produce gamma rays that are scattered back to the sonde. As an alternative, some of the neutrons are scattered back to the sonde after diffusing through the formation in a series of energy degrading collisions with formation nuclei. In a manner that is somewhat analogous to the latter method, gamma rays emitted by the source also may be scattered back to the sonde after losing energy through interactions with the atomic structure of the formation.

Measured characteristics of these radiations, such as intensity (counting rate) and energy (pulse height), if detected at the sonde, often provide a basis for identifying likely oil production horizons.

These radiations, however, are not observed as a regularly occurring succession of uniform events. Instead, they are observed as a train of more or less random events, in which the intervals between the detected radiations are irregular and the radiation energies are not uniform. Radiation intensity, moreover, may be on the order of many thousands of "counts," or detected radiations, in each second. In spite of these apparently high counting rates, each individual count is valuable because it enhances the statistical validity of any computations based on the observed data. Counting rate signals and pulse height information, however, occasionally are lost or distorted during transmission through the cable that connects the detector in the sonde with the recording equipment at the earth's surface.

These signal transmission difficulties are attributable, at least in part, to closely spaced pulses, which occur when two or more radiations are detected almost simultaneously. These pulses may "pile up" in the sonde transmission circuit if the resolving time of the transmission circuit is greater than the spacing between the pulses. The signal at the earth's surface may then be interpreted as a single count, instead of the two or more counts that actually were detected.

The inherent electrical characteristics of the cable usually limit the overall system resolving time. For example, during routine well logging operations, signals often are transmitted through more than 15,000 feet of cable. The band width of such long cables is much less that that of the input and output circuitry. This causes the leading and trailing edges of steep wave fronts applied to the cable input to become smeared so that a pulse which has negligible rise and fall times at the cable input appears at the cable output with appreciable rise and fall times. In practice, this limits the resolution of closely spaced pulses.

Accordingly, it is an object of the invention to provide an improved signal technique for transmitting data on a cable at a high rate.

It is another object of the invention to reduce signal losses during transmission from a borehole logging tool to the earth's surface.

It is another object of the invention to reduce the resolving time of wire line signal transmission from a borehole logging tool to the earth's surface.

It is still another object of the invention to reduce the resolving time of wire line signal transmission systems.

It is a further object of the invention to equalize signal transmission speed and attenuation through a multiconductor cable in order to minimize the distortion present in the output signal.

SUMMARY

In accordance with the invention, signals are transmitted from a sonde to the earth's surface through a multiconductor cable by sequentially applying successive portions of the signal to the conductors in predetermined voltage patterns, or modes. Circuitry on the earth's surface extracts the signal on each mode and connects it to appropriate delay and attenuation circuits. The delay and attenuation circuits equalize differences in transmission speed and cable attenuation experienced by the individual modes. The signal derived from each mode then triggers a pulse generator in which the output pulse height is proportional to the signal pulse height and the pulse width is a predetermined value. The pulses then are combined to produce a composite signal that corresponds to the original signal in the logging tool.

These modes do not couple to one another while propagating through the cable. Thus, if a signal impressed on the cable input excites a particular mode, and a set of individual circuits is employed at the cable output each of which corresponds to a different respective mode, then an output signal will be obtained only from the circuit that corresponds to the mode inserted at the cable input. Thus, in effect, each mode is transmitted as if it were on a separate cable. If two or more modes are superimposed at the cable input, signals will be obtained only from the output circuits corresponding to and in proportion to the signals transmitted in the respective modes. In this way more than one signal may be transmitted on the cable simultaneously without interference.

The modes, however, do not in general propagate with the same velocity and attenuation, and hence, if the mode signals are combined at the surface without equalization, the resultant signal will suffer from a large degree of distortion. Therefore, to minimize signal distortion, equalization consisting of delay circuits and attenuators is used at the mode outputs to compensate for differences in signal attenuation and transmission speed among the modes before the signals are combined to produce a single output. Further equalization may be used to compensate for the differences in the bandwidth of the cable for transmission by way of the different modes.

The conductor voltage patterns which define the modes are not arbitrary because a unique set of patterns is determined by the geometry and electromagnetic properties of the cable under the requirement that the mode signals do not couple to one another while propagating. For a multiconductor cable the number of possible modes is equal to the number of conductors.

While any conductor voltage pattern impressed on the cable input may be considered as a superposition of modes, the output signal at the surface will in general be distorted if the conductor signals are not resolved into mode signals. Furthermore, by impressing the signals on the cable among the modes in a predetermined manner the rate at which information may be transmitted on the cable is enhanced.

In accordance with one aspect of the invention, in multiple mode transmission the average time between the signal data bits transmitted on a single mode is the product of the number of modes and the average time between the bits being transmitted. Consequently, the resolving time available to each mode is increased in proportion to the number of modes used. Thus, for a transmission system of N modes in which $t$ is the time that the signal is transmitted in each mode, N-1 data bits can be transmitted through the other modes during the interval $(N-1)t$ that exists between each transmission through mode N. Accordingly, the resolving time of a transmission system of N modes is reduced by about a factor of 1/N relative to single mode wire line transmission systems that have characterized the prior art.

While the average time between pulses on a particular mode is increased by a factor of N, the ability to resolve closely spaced pulses is improved by more than a factor of N if the pulses occur randomly in time as in the case of pulses from radiation detectors.

Thus, if the probability distribution as a function of time of the pulses to be transmitted follows the poisson distribution (which is the situation with regard to pulses from radiation detectors), then the probability, P, of n pulses in a time interval $\Delta t$ is:

$$P(N, x) = \frac{x^N e^{-x}}{N!}$$

where $x = \Delta t/T$, and $T$ is the mean time between pulses. If the system can resolve pulses sent on a single mode with spacings greater than $\Delta t$, then the probability of an error caused by pile-up of more closely spaced pulses during single mode transmission is:

$$P(>1, x) = \sum_{i=2}^{i=\infty} P(i, x)$$

If $N$ pulse transmission modes are employed, however, the probability of a pile-up error on any mode is:

$$P(>N, x) = \sum_{i=N+1}^{i=\infty} P(i, x)$$

Values of $P(>N,x)$ are shown in the following table for practiced values of $x$ and values of $N$ from 1 to 7.

PROBABILITY OF AN ERROR FROM PULSE PILE-UP WITH N MODES MULTIPLEXED

| N/x | 2 | 1 | .5 | .3 | .1 |
|---|---|---|---|---|---|
| 1 | .5940 | .2642 | .0902 | .0369 | .0047 |
| 2 | .3233 | .0803 | .0144 | .0036 | .0002 |
| 3 | .1429 | .0190 | .0018 | .0003 | .0000 |
| 4 | .0527 | .0037 | .0002 | .0000 | |
| 5 | .0166 | .0006 | .0000 | | |
| 6 | .0045 | .0001 | | | |
| 7 | .0011 | | | | | where $x = \Delta t/T$.

From this table it can be seen that the probability, P, of an error from pulse pile-up with an increasing number of transmission modes decreases much more rapidly than $1/N$. For example, the probability of more than one pulse occuring within half the average time between each pulse, or $$x = \Delta t/T = 0.5$$

for one transmission mode is 0.0902, where the pulse occurrence is random and conforms to a poisson distribution. If four transmission modes are used, the error probability is reduced to 0.0002. By contrast, however, if the random nature of the input signal is not considered, the resolving time appears to be reduced only by a factor of 0.25 with a four-mode transmission system.

More particularly, a sonde is equipped with at least one radiation detector circuit for producing a sequence of random pulses in response to radiations emanating from the earth formation surrounding a borehole. A switching circuit in the sonde responds to each serially received pulse by enabling one gate in an array of gates. The enabled gate applies the pulse to circuitry that impresses the pulse on the cable conductors in a combination of negative and positive voltages that are individual to the enabled gate and excite the cable mode associated with the gate Each mode as it is received in a logic circuit on the earth's surface enables a specific output circuit. The enabled output circuit applies the signal borne by the mode to an attenuator, a delay circuit and an attenuator, to compensate for differences in mode propagation speed or mode attenuation, as appropriate, relative to to the other transmission modes. The individual signals in each mode then are combined by the enabled gates in an ordered sequence to reproduce the downhole input pulse train in amplitude and time distribution.

With these and other objects in mind, the features and advantages of the present invention will be best understood from the following description when read in conjunction with the accompanying drawing. It will be understood that the description and accompanying drawing are for the purpose of illustrating a preferred embodiment and not to be construed as defining the scope or limits of the invention, reference being had for the latter purpose to the appended claims.

DESCRIPTION OF THE PREFERRED EMBODIMENTS

Figure 1:
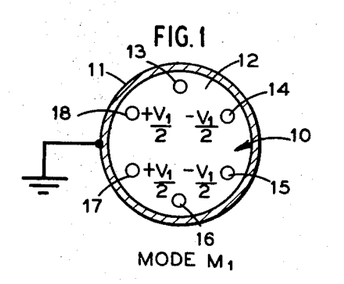
FIG. 1 shows a transverse section of an exemplary well logging cable bearing one signal transmission mode.

For a more complete appreciation of the invention, FIG. 1 shows a typical multiconductor cable 10 for use in radioactivity logging. The cable 10 comprises an outer stranded serving of armor 11 that sheaths a matrix of electrical insulation 12. Six electrical conductors 13 through 18 are embedded in the insulator 12. In the embodiment of the invention shown in FIG. 1, conductors 14, 15, 17 and 18 transmit signals through the cable 10 in a specific voltage pattern, or mode, which is referred to as mode $M_1$. The signal pulse being transmitted through mode $M_1$ at the instant under consideration is a positive pulse of amplitude $V_1$ volts. The mode $M_1$ for a signal of unit pulse amplitude is characterized by a positive pulse of 0.5 volt amplitude on conductors 17 and 18 and a negative pulse of 0.5 volt amplitude on conductors 14 and 15. With a signal pulse of amplitude $V_1$ volts, the absolute value of the pulse voltage on conductors 14, 15, 17 and 18 becomes 0.5 $|V_1|$ with the same polarities as for the unit signal.

Figure 2:
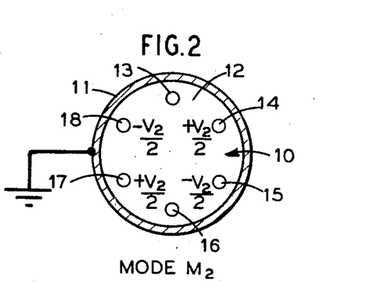
FIG. 2 shows another signal transmission mode in the cable shown in FIG. 1.

After the signal pulse $V_1$ has been applied to the cable 10 in mode $M_1$, the next sequential signal pulse, having a pulse amplitude of $V_2$ volts, is transmitted through the cable 10 (FIG. 2) in mode $M_2$. Mode $M_2$ is identified for a unit signal by the positive polarity and pulse amplitude of 0.5 volts in conductors 14 and 17, and the negative polarity and pulse amplitude of 0.5 volts in conductors 15 and 18. The pulse amplitudes on the conductors for the pulse of amplitude $V_2$ volts transmitted on mode $M_2$ is obtained in the same manner as with the pulse on mode $M_1$, i.e., each conductor pulse and amplitude for a unit signal on mode $M_2$ is multiplied by $|V_2|$. Conductors 13 and 16 can be used for other purposes, as for example, to transmit power to the multiplexing equipment in the logging sonde, which will be described subsequently.

Figure 3:
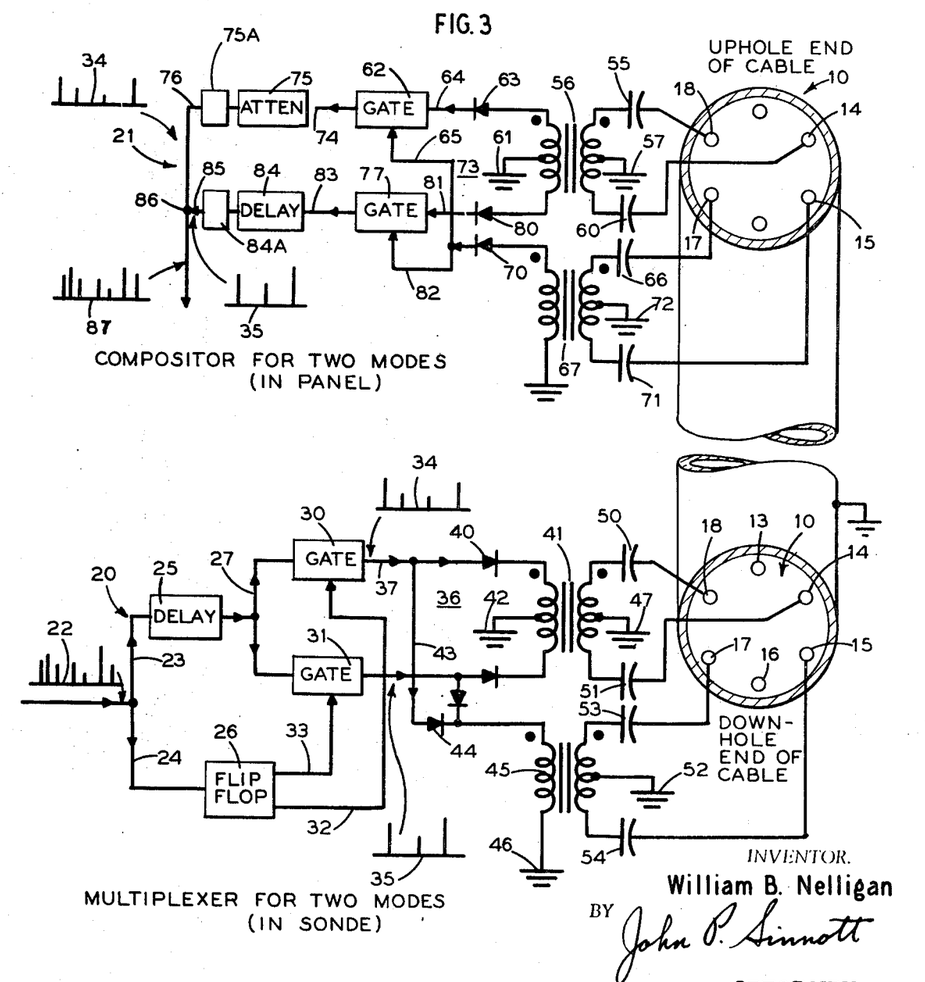
FIG. 3 shows a typical system in accordance with the invention for transmitting information in two modes.

FIG. 3 shows a typical system for transmitting data through the cable 10 in two modes. The system comprises a multiplexer circuit 20 in the sonde and a compositor circuit 21 at the earth's surface that responds to the modes $M_1$ and $M_2$. Illustratively, the multiplexer circuit 20 receives an input signal 22 that comprises a train of pulses of random height and separation. Each pulse in the sequence is applied through conductors 23 and 24 to a delay circuit 25 and a switching or flip-flop circuit 26.

The first-arriving pulse in the input signal 22 activates the flip-flop circuit 26 to change state, and thus send an enabling signal to a gating circuit 30 through conductor 32. The next pulse in the input signal 22 causes the flip-flop 26 to again change state and transmit an enabling signal through conductor 33 to a gating circuit 31, while simultaneously removing the enabling signal from gating circuit 30. Thus, the flip-flop 26 alternately enables and disables the gates 30 and 31 to activate only one of the gates at a time.

The delay circuit 25 retards the propagation of the input pulses toward the gates 30 and 31 for the length of time required for the flip-flop circuit 26 to change state. The appropriately delayed input signal pulses are sent from the delay circuit 25 through a conductor 27 to the gating circuits 30 and 31. Inasmuch as the gates 30 and 31 are enabled in response to alternate pulses, each gate passes only every other pulse and thereby divides the input signal 22 into two groups 34 and 35 which will be transmitter through the armored cable 10 in modes $M_1$ and $M_2$, respectively.

The positive output pulses from the gating circuits 30 and 31 in the groups 34 and 35 are applied to a logic or diode circuit 36. The positive output pulses in the group 34 are sent from the gate 30 through a conductor 37. These pulses transmitted through a positively poled, or forward biased diode 40 and the primary winding of a transformer 41 to a grounded center tap 42. The pulses also are applied through a conductor 43 and a positively poled diode 44 to the primary winding of a transformer 45 and ground 46. In order to equalize the voltages induced in the secondary windings of transfers 41 and 45, the turn ratio of the transformer 41 is equal to twice the turn ratio of the transformer 45. If, moreover, other voltages such as power supply voltages are applied to the cable conductor 13, it is apparent from symmetry considerations that the coupling to conductor 18 is the same as it is to conductor 14. Similarly, the coupling to conductor 17 is the same as it is to conductor 15. The same considerations apply to coupling from conductor 16 and, therefore, it is apparent that the voltages on conductors 13 and 16 will not induce spurious signals in the transformers 41 and 45.

The positive pulse transmitted through the primary winding of the transformer 41 induces a positive potential in the secondary winding. This positive voltage is applied to the cable conductor 18 through a path that includes a grounded center tap 47, capacitor 50 and the conductor 18.

By inducing a voltage across the entire secondary winding of the transformer 41, the center tap, which is grounded at 47, produces a negative pulse in the conductor 14 through a path that includes the ground 47, the secondary winding of the transformer 41, a capacitor 51 and the conductor 14. The negative pulse necessarily has an amplitude that is equal and opposite to the amplitude of the pulse in the conductor 18.

In a similar manner, the positive pulse in the primary winding of the transformer 45 produces a positive pulse in the cable conductor 17 through a path that includes a grounded center tap 52 in the secondary winding of the transformer 45, a capacitor 53 and the conductor 17. The corresponding negative pulse is applied to the conductor 15 through a path that includes the grounded center tap 52, a capacitor 54 and the conductor 15.

In summation, positive output pulses from the gating circuit 31 pass through the primary of transformer 45 in the same direction as the pulses from gating circuit 30 so that both trains produce the same polarities in conductors 15 and 17, respectively. The pulses from gates 30 and 31 pass through opposite halves of the primary of transformer 41, however, so that opposite polarities are produced on the conductors 14 and 18 by these gate signals.

On the earth's surface the compositor 21, which conveniently can be mounted in the panel of a logging truck, reassembles the signal transmitted in the modes into a coherent signal that corresponds to the input signal 22. Accordingly, with mode $M_1$ the positive signal on the conductor 18 and the negative signal on conductor 14 are received at the terminal end of the cable 10 by capacitors 55 and 60, respectively, and the primary winding of a transformer 56 that has a grounded center tap 57. The combined effect in the center-tapped primary winding of the positive pulse in conductor 18 and the negative pulse in conductor 14 induces a positive pulse in the upper half and a negative pulse in the lower half of the secondary winding of the transformer 56. The positive pulse in the upper half of the secondary winding of transformer 56 is applied to a gating circuit 62 through a path from the ground 61, the secondary winding of the transformer 56, a positively poled diode 63 and a conductor 64. The negative pulse in the lower half of the secondary winding of transformer 56 is blocked by the reverse biasing of a diode 80 in a conductor 81. Blocking this induced pulse prevents the signal transmitted in mode $M_1$ from being passed by the gate 77.

The gating circuit 62 is enabled by a positive coincident pulse in the conductor 65 which is induced in the secondary winding of transformer 67. The combined effect in the center tapped primary winding of the transformer 67 of the positive pulse in the conductor 17 and the negative pulse in the conductor 15 induces a positive pulse in the secondary winding of the transformer 67. This pulse is sent through a positively poled diode 70 and the conductor 65 to enable the gate 62.

Gating circuit 62, enabled by the coincident positive pulses that were applied to the conductor 65 through the diode 70 passes the signal on the conductor 64 which was carried in mode $M_1$. The mode $M_1$ signal is then applied through an output conductor 74 to an attenuator 75. The attenuator 75 compensates mode $M_1$ for the different attenuation experienced by mode $M_1$ in the cable 10 relative to mode $M_2$. The signal pulse in the output conductor of the attenuator 75 is applied to a pulse generator 75A to produce a pulse of a height that is proportional to the height of the signal in the attenuator output conductor and a predetermined pulse width that is equal to the width of the input pulses 22.

The pulse output from the pulse generator 75A is coupled to a conductor 76. The train of pulses in this conductor corresponds to the group 34 that was applied to the cable 10 by the gating circuit 30.

Mode $M_2$ is transmitted through the cable 10 and induces a potential in the secondary winding of the transformer 56 that has a polarity opposite to that which was induced by mode $M_1$. Thus, in response to the positive potential on the conductor 14, and the negative potential on conductor 18, a positive pulse is induced in the lower half and a negative pulse in the upper half of the secondary winding of the transformer 56. The positive pulse in the lower half is applied to the gating circuit 77 through a path that includes grounded center tap 61, and the lower half of the secondary winding of the transformer 56. This pulse is blocked by the reverse biasing of the diode 63 thus preventing the mode $M_2$ pulse from being passed by the gate 62.

In mode $M_2$, the potentials in the conductors 15 and 17 induce a positive pulse in the secondary winding of the transformer 67 that forward biases the diode 70 and passes the positive pulse on conductor 82 to enable gate 77. The coincident positive signal on the conductor 81 is passed by the enabled gate 77 to an output conductor 83. A delay circuit or delay line 84 that is coupled to the conductor 83 compensates for the different signal propagation speed in the cable 10 of the mode $M_2$ relative to mode $M_1$. The pulses from the delay line are applied to a pulse generator 84A that produces a pulse of a height proportional to the height of the signal from the delay line 84 and a pulse width equal to the width of the pulses in the input train 22. Consequently, the pulses in the output conductor 85 correspond in spacing and amplitude to the group 35 that was applied to the cable 10 by the gating circuit 31.

A junction 86, which combines the signals in the conductors 76 and 85 produces an output signal 87 that corresponds in pulse height and pulse separation to the input signal 22.

The gates 62 and 77 are enabled when a signal pulse appears on modes $M_1$ or $M_2$ to the gates 62 and 77. If a signal or noise should appear on a mode other than $M_1$ or $M_2$, however, the gates 62 and 77 will not be enabled and consequently, there will be no output from the compositor 21. In summary, the input pulse train is partitioned into two distinct pulse trains which are transmitted on the cable by separate modes. The pulses received at the surface in each mode have been smeared by transmission on the cable and therefore they are converted to narrow rectangular pulses with the same height and spacing to prevent overlap when the outputs from the two modes are combined.

Clearly, the invention is not limited to pulse transmission or to a two-mode signal transmission system. The number of possible transmission modes is determined apparently only by the number of conductors in the armored cable. Each mode transmitted through a N conductor cable may be represented by one respective mode vector in a system of vectors $E_1$, $E_2$,...$E_N$, in which a subscript $j$ designates a particular one of the modes $M_j$ in the group identified by the subscripts 1 to N. The individual mode vector determines the relative instantaneous amplitude and polarity of the voltage applied to each of the cable conductors for the specific signal being transmitted in the mode under consideration. These individual conductor voltages, representing a particular mode are the components of the associated mode vector and can be described, for example, in terms of a set of N basis vectors $e_1, e_2,...e_N$, where $e_i$ represents a potential on the conductor of unity and a zero potential on all of the other conductors. In this situation, the mode $M_j$ is represented by the vector $E_j$, where:

$$E_j = \sum_{i=1}^{i=N} u_{ij} e_i$$

in which $u_{ij}$ is a real number and provides a weighting factor for the $e_i$ components of the $M_j$ mode signal, i.e...a unit voltage on mode $M_j$ corresponds to a voltage equal to $u_{ij}$ on conductor $i$. Furthermore, where the subscript $k$ designates any basis vector in the group $e_1, e_2,...e_N$, we impose the conditions:

$$e_j \cdot e_k = \delta_{jk}$$

and $$\sum_{i=1}^{i=N} u_{ij} u_{ik} = \delta_{jk}$$

where $\delta_{jk}=0$ if $j \neq k$ and equals unity if $j=k$. These conditions establish the "orthogonality" and "normality" of the mode vectors, two terms that mean mathematically $E_j E_k = \delta_{jk}$.

Since the mode vectors $E_1,...E_N$ and the basis vectors $e_1,...e_N$ are of unit amplitude, provision is made for unequal mode signals by considering the vector $$kv_j E_j = k\sum_{i=1}^{i=N} v_j u_{ij} e_i$$

where $v_j$ is the instantaneous amplitude of the signal transmitted on mode $M_j$ and $k$ is a constant of proportionality. The instantaneous voltage on conductor $i$ corresponding to the signal amplitude $v_j$ on mode $M_j$ is therefore equal to $kv_j u_{ij}$ and the instantaneous total voltage on conductor $i$ is:

$$k\sum_{j=1}^{j=N} v_j u_{ij}$$

Thus, the signal on conductor $i$ at any instant is the sum of the instantaneous values of the components corresponding to each mode signal on this conductor.

Figure 4:
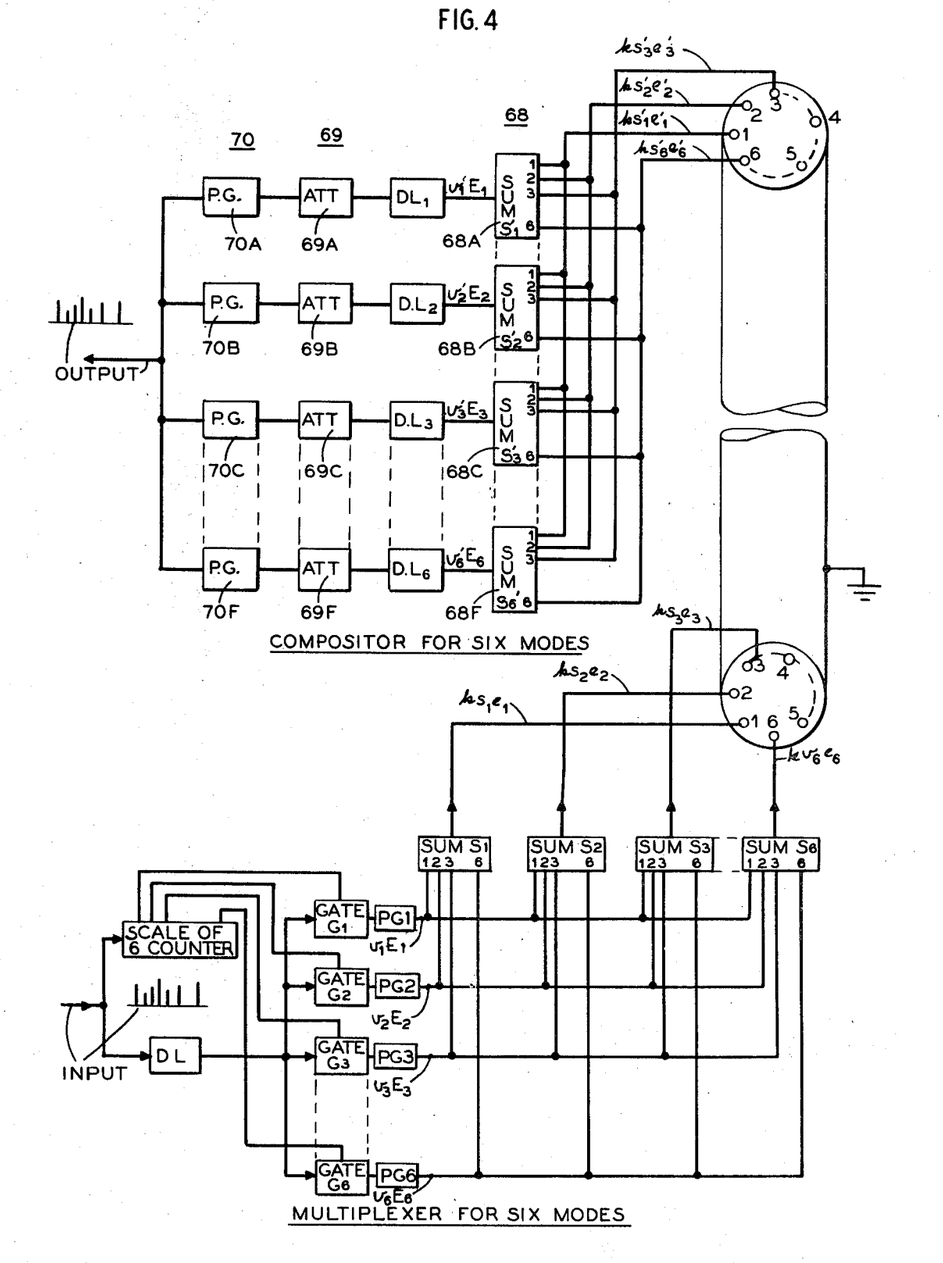
FIG. 4 shows another embodiment of the invention.

While the mode transmission is applicable to signals of arbitrary waveform in a particular embodiment, as shown in FIG. 4, a sequence of random input pulses is applied simultaneously to a scale of six counter and a delay circuit DL in a six-mode multiplexer. The delay circuit holds up each incoming pulse until the scale of six counter has enabled the appropriate sequential gate in an array of gates $G_1$ to $G_6$ to pass the delayed incoming pulses sequentially to the pulse generators $PG_1$ to $PG_6$. Each pulse generator provides a rectangular pulse of the same amplitude as the pulse from the associated gate but the pulse width is predetermined to optimize transmission on the cable for the mode associated with the particular pulse generator. Thus, the output of pulse generator $PG_3$ corresponds to the mode vector $v_3 E_3$, the pulse generator $PG_6$ output corresponds to the mode vector $v_6 E_6$, and so on. This mode vector pulse $v_3 E_3$ is fed through an output bus from the pulse generator $PG_3$ through individual input conductors to the summing circuits $S_1$ through $S_6$. The summing circuits actually resolve the mode vector $E_3$ into the component weighted basis vector voltages $u_{i3} e_i$. The subscript $i$ of course, identifies the specific one of the six cable conductors to which the respective summing circuit in the group of circuits $S_1$ through $S_6$ is coupled. In order to provide an output with the appropriately weighted component potentials each of the summing circuits typically has an operational amplifier, with input resistors individual to each of the six transmission modes. These input resistances, however, are so chosen that the relative values of these resistances are inversely proportional to the respective basis vector weighting factor $u_{ij}$.

In the case where a particular $u_{ij}$ is negative, a unity gain inverting amplifier is inserted in series with the input resistor to provide the necessary negative weighting. In practice the pulse generator output pulse widths are usually greater than the input pulse widths so that the pulses on several modes may overlap when the input signals are closely spaced. This does not affect resolution of the mode transmission because the modes do not couple to one another on the cable and the individual mode signals are extracted separately at the earth's surface. Therefore, the instantaneous pulse amplitude of the output of the summing unit $S_i$ is equal to.

$$ks_i = k\sum_{j=1}^{j=N} v_j u_{ij}$$

and is represented by the vector $ks_i e_i$ where $k$ is the constant of proportionality and $v_j$ is the instantaneous value of the output from pulse generator $PG_j$.

In transmission through the cable 10, all of the conductor pulses associated with a single mode travel at the same speed and are attenuated by the same proportionate amount. Thus there is a transit time $t_j$ and an attenuation factor $a_j$ which are characteristic of a particular mode $M_j$. Consequently, the pulses appearing on conductors 1 through 6 at the earth's surface are represented by the vectors $ks'_1 e_1$ through $ks'_6 e_6$, respectively, where the primed quantities $s'_1$ through $s'_6$ account for the attenuation and delay time of the mode pulses. It is assumed, although not explicitly shown in the notation used in descriptions which follow that each mode pulse is shifted in time by the associated transit time of the particular mode.

Continuing with the example, in the six mode compositor on the earth's surface, summing circuits 68 respond, for example, to respective attenuated and delayed conductor pulses represented by vectors $ks'_1 e_1$ through $ks'_6 e_6$ by combining these pulses into their resultant mode vector pulses $v'_k E_j$. The summing circuits 68a through 68f, therefore, execute logic functions which complement those of the downhole summing circuits $S_1$ through $S_6$ hereinbefore described.

Figure 5:
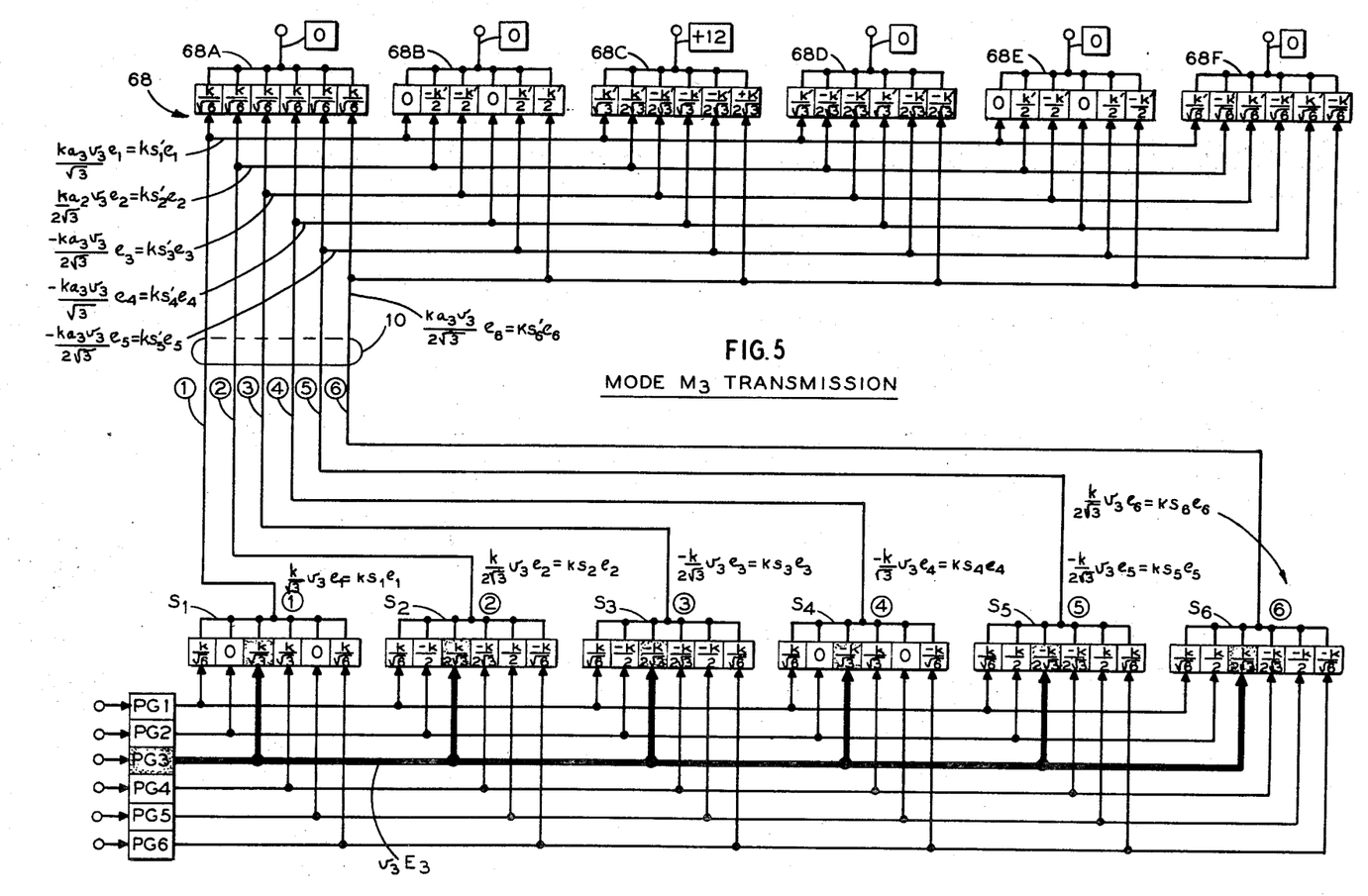
FIG. 5 is a schematic diagram that emphasizes certain features of the invention.

As shown schematically in FIG. 5, appropriate combinations of basis vector weighting coefficients $u_{ij}$ in the downhole summing circuits $S_1$ to $S_6$, and basis vector weighting coefficients $u'_{ik}$ in the circuits 68a through 68f on the earth's surface provide the logic circuits needed to recompose the attenuated conductor pulses into their appropriate mode pulses. These circuits establish a unique output pulse for each one of the surface summing circuits 68 in accordance with the respective mode applied to the cable 10.

For example, the gate $G_3$-$PG_3$ combination is enabled to transmit a pulse of amplitude $v_3$ to the earth's surface in the third mode, $M_3$. The gate $G_3$ applies the mode pulse voltage $v_3$ represented by the vector $v_3 E_3$ to a bus that is common to the $M_3$ mode resistor-amplifier combination in each of the downhole summing circuits $S_1$ through $S_6$. The appropriate resistor-amplifier combinations then weight the pulse voltage so applied to the input of summing unit $S_i$ by a factor $ku_{i3}$. Thus, the weighting factor for mode $M_3$ in the summing circuit $S_2$, is:

$$ku_{23}=\frac{k}{2\sqrt{3}} \text{ i.e., } u_{23}=+\frac{1}{2\sqrt{3}}$$

and the pulse voltage on conductor 2 is represented by the vector:

$$ku_{23}v_3e_2=\frac{k}{2\sqrt{3}}v_3e_2.$$

These summing circuit output signals are coupled to respective conductors in the cable 10 for transmission to summing circuits 68 on the earth's surface.

As hereinbefore mentioned, the circuits 68 also perform logic functions by applying weighting values to the pulse voltages received at the earth's surface. In this instance, however, the voltages in the cable conductors are applied to a respective resistor-amplifier combination in each of the circuits 68a through 68f.

Each of these compositor summing circuit resistor-amplifier combinations weights its input pulses such that for a mode $M_3$ transmission, for example, all of the input pulses mutually cancel each other, except the circuit 68c that is individual to the $M_3$ mode. The output pulse voltages from the circuit 68c, moreover, is equal to:

$$a_3v_3kk'\sum_{i=1}^{i=6}u^2_{i3}=a_3kk'v_3$$

and is represented by the mode vector:
$$a_3kk'v_3E_3.$$

In a similar manner, enabling the downhole gate $G_6$ for a mode $M_6$ transmission establishes a signal only at the output of the compositor summing circuit 68f, and so on for each of the remaining four modes.

In summation, the weighting value of the resistor-amplifier combination for the $PG_j$ input to the downhole summing unit $S_i$ is $ku_{ij}$ while uphole the weighting value for the conductor $i$ input to the summing unit $S'_h$ is equal to $k'u_{ih}$. Therefore, the pulse voltage at the output of the uphole summing unit $S'_h$ resulting from transmission on modes $M_1$ through $M_6$ of pulse voltages $v_1$ through $v_6$ from pulse generators $PG_1$ through $PG_6$, respectively, is equal to:

$$v'_h=\sum_{i=1}^{i=6}k'u_{ih}kS'_i=k'\sum_{i=1}^{i=6}u_{ih}\sum_{j=1}^{j=6}a_jku_{ij}v_j$$
$$=k'k\sum_{j=1}^{j=6}a_jv_j\sum_{i=1}^{i=6}u_{ih}u_{ij}=k'k\sum_{j=1}^{j=6}a_jv_jS_{hi}=k'ka_hv_h$$

Thus, it is apparent that an output is produced at the uphole summing unit $S_h$ only by pulses from $PG_h$ transmitted on mode $M_h$. Furthermore, it is clear that if each of the outputs of these units is compensated for the associated mode attenuation and propagation time, then they will have the same amplitude and time distribution as the outputs of the downhole gates.

Turning once more to FIG. 4, the delay circuits $DL_1$ to $DL_6$ at each compositor summing unit output compensates for the different propagation time of each mode in the cable so that the signals at the delay circuit outputs bear the same time relation relative to each other as the corresponding signals at the gate outputs in the downhole multiplexer.

The relative differences in the signal attenuation $aj$ between the six modes are compensated for by adjustment of attenuator circuits 69, in which each circuit 69a through 69f is individual to a respective one of the compositor summing circuits 68. Compositor pulse generator circuits 70 respond to the respective attenuator circuits to produce amplified output pulses of a predetermined width. The pulse generator output amplitudes are proportional to their respective input mode amplitudes to preserve the relative pulse amplitudes at the outputs of the gates $G_1$–$G_6$. These combined pulses establish a pulse train that has the same time distribution and relative amplitudes as the input pulse train applied to the downhole multiplexer.

The width of the output pulses from the pulse generator units should preferably be less than or equal to the width of the pulses at the multiplexer input. The multiplexer and compositor summing units shown in FIG. 4, moreover, are capable of processing overlapping pulses, the resolution depending on the noise level and the bandwidth of the cable for a single mode.

Figure 6:
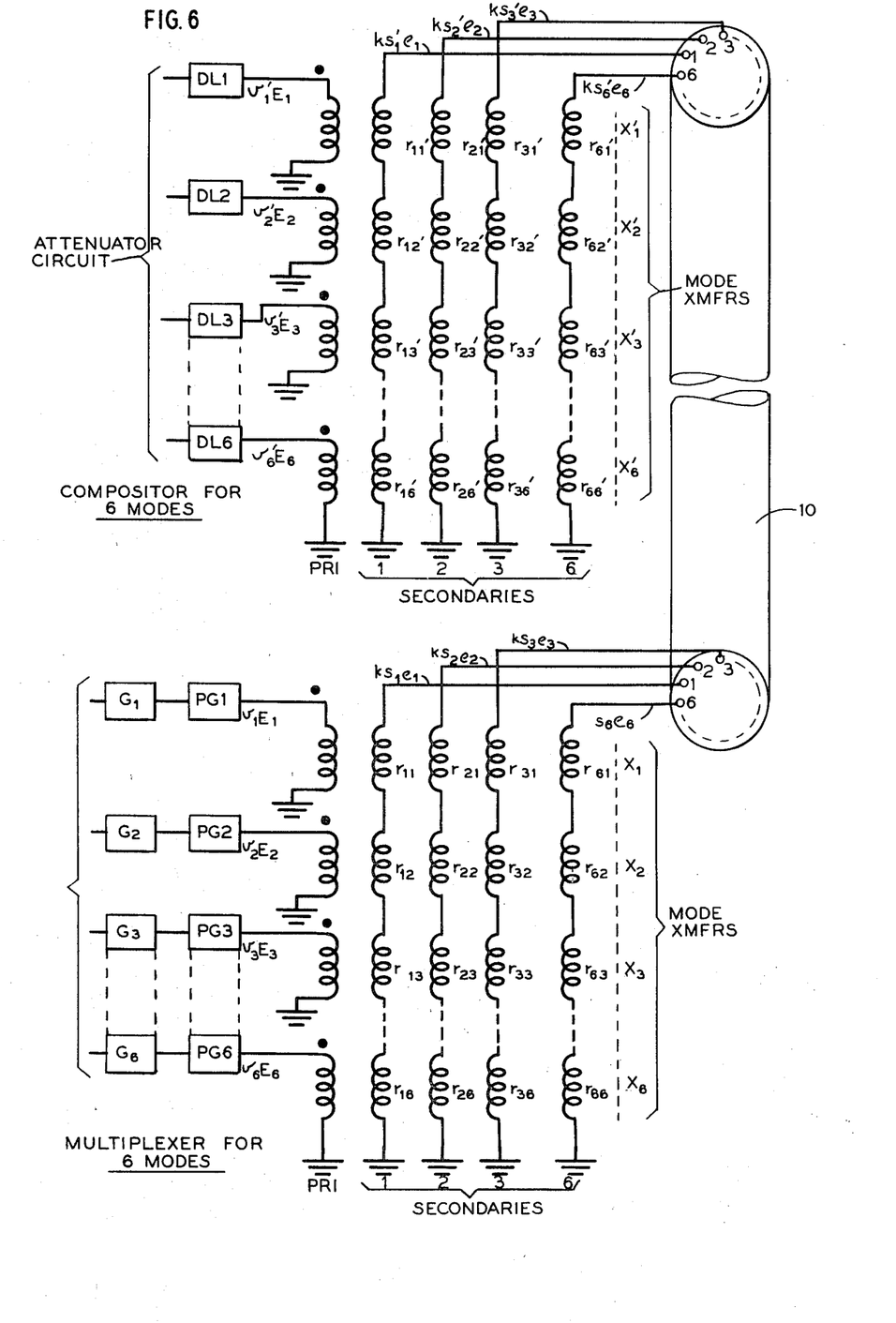
FIG. 6 is a schematic diagram of a portion of another embodiment of the invention.

The summing circuits described in connection with FIGS. 4 and 5 may be replaced by mode transformers when direct current signal transmission is not required. This arrangement is shown in FIG. 6. If, for example, a gate $G_3$ in the array of gates $G_1$ through $G_6$ is enabled as described in connection with FIG. 4, a pulse generator $PG_3$ in the group of pulse generators $PG_1$ to $PG_6$ for a six-mode transmission system causes pulse voltages $v_3r_{13}$ through $v_3r_{63}$ represented by the vectors $v_3r_{13}e_1$ through $v_3r_{63}e_6$ to be induced in the secondary windings of transformer $X_3$. In this embodiment of the invention, the mode vector $E_j$ is resolved into appropriately weighted component basis vectors through the turn ratios of the mode transformers. The turns ratio $r_{ij}$ is made equal to $ku_{ij}$ where $k$ is a constant of proportionality. The pulse voltage on conductor $i$ is therefore equal to:

$$\sum_{j=1}^{j=6}v_jr_{ij}=k\sum_{j=1}^{j=6}v_ju_{ij}=ks_i$$

and is represented by the vector $ks_ie_i$. The pulses on the conductors propagate to the surface and are resolved at the surface by a compositor consisting of mode transformers $X'_1$ through $X'_6$. These transformers have turns ratios $r'_{ij}$ such that for transformer $X'_j$ the pulse voltage induced in the ith secondary by a pulse voltage $v'_j$ in the primary is equal to $v40\ 40\ _j'u_{ij}$ where the polarity mark is at the top of the winding if $u_{ij}$ is positive and at the bottom if $u_{ij}$ is negative. The pulse voltage on conductor $i$ at the surface is equal to:

$$ks'_i=k\sum_{j=1}^{j=6}a_jv_ju_{ij}$$

Denoting the pulse voltages induced in the primaries of the compositor mode transformers $X'_1$ through $X'_6$ by $v'_1$ through $v'_6$, respectively, it is clear that the pulse voltage on conductor $i$ must also be equal to:

$$ks'_i=\sum_{j=1}^{j=6}v'_jr'_{ij}=k'\sum_{j=1}^{j=6}v'_ju_{ij}$$

so that when these sums are equated, we obtain the set of equations:

$$\sum_{j=1}^{j=6}u_{ij}(ka_jv_j-k'v'_j)=0 \quad i=1, 2, 3, \ldots 6$$

The conditions hereinbefore imposed on the numbers $u_{ij}$ require that the determinant $|u_{ij}|$ of these equations has the value unity. Thus, the only solution is:

$$ka_jv_j-k'v'_j=0 \text{ or } v'_j=\frac{k}{k'}a_jv_j$$

Therefore, the pulse transmitted on mode $M_j$ from downhole pulse generator $PG_j$ produces an output only from the uphole mode transformer $X'_j$. Furthermore, it is clear that the pulse outputs from the uphole mode transformers $X'_1$ through $X'_6$ when compensated for the cable attenuation and propagation time individual to the mode associated with each transformer will have the same relative amplitude and time distribution as the pulses from the downhole pulse generators $PG_1$ through $PG_6$, respectively.

As hereinbefore described, each output pulse represented by the vector $v'_j E_j$ is delayed for the correct length of time by the circuit $DL_j$ in the group of delay circuits $DL_1$ through $DL_6$ in order to compensate for the signal propagation speeds experienced by the different modes during transmission through the cable 10. Subsequent manipulation of the signals from the delay circuits $DL_1$ through $DL_6$ proceeds preferably as described in connection with FIG. 4.

Figure 7:
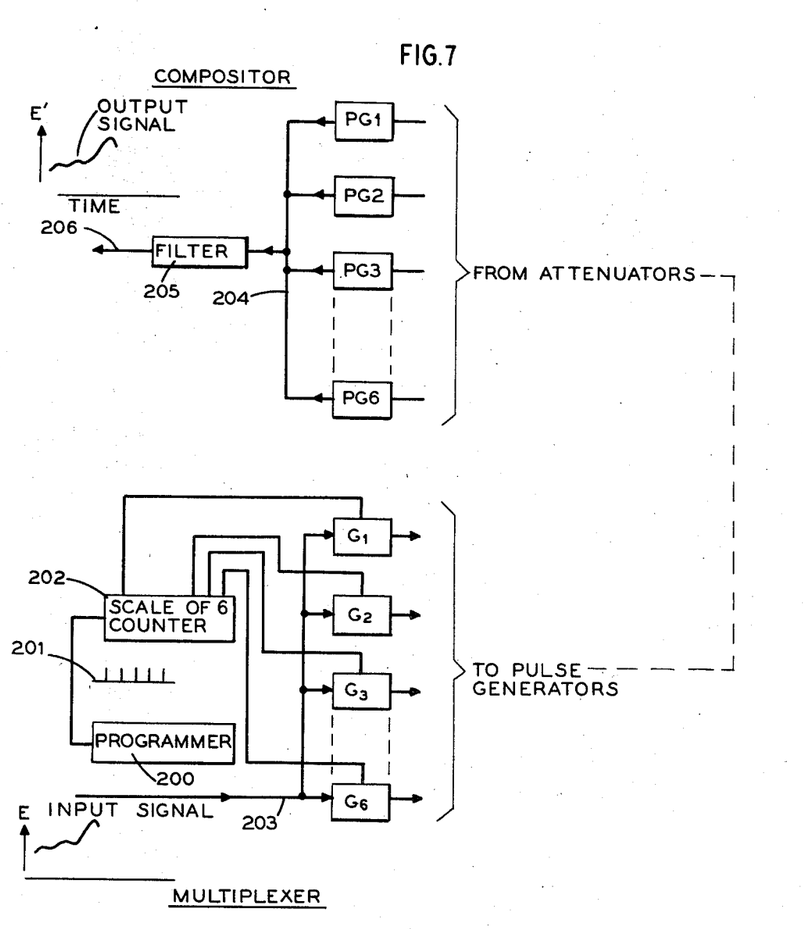
FIG. 7 is a diagram of an alternative circuit for use in the illustrative embodiment of the invention shown in FIG. 4.
Figure 8:
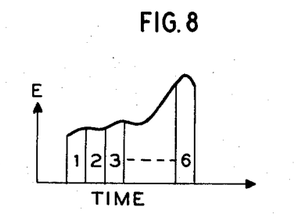
FIG. 8 is a graph of voltage as a function of time at the input to the circuit shown in FIG. 7.

The six-mode multiplexing scheme also may be adapted with slight modification to the transmission of a continuous input signal, as shown in FIG. 7. In this case, the gates $G_1$ to $G_6$ are driven in sequence by a programmer 200. The programmer 200 generates a pulse train 201 with predetermined time intervals between each of the pulses in order to sequentially trigger a scale of six counter 202. The signals from the counter 202 enable the gates $G_1$ through $G_6$ in sequence. These gates remain enabled for periods of time determined by the intervals between the programmer pulses. Each gate, as it is enabled, passes a corresponding time-coincident portion of the input signal in the sequence 1 to 6 (FIG. 8) from an input conductor 203 (FIG. 7) through the enabled gate and onward to the earth's surface in the manner hereinbefore described in connection with FIG. 4.

Figure 9:
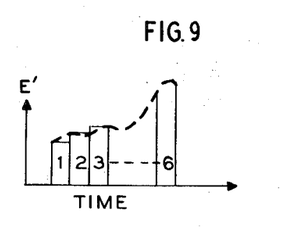
FIG. 9 is a graph of voltage as a function of time at the output of the circuit shown in FIG. 7.

The gate outputs trigger pulse generators which produce output pulses proportional to their respective input pulse amplitudes. The width of the pulse generator output pulses may be chosen to correspond to the bandwidth or pulse resolution time of the associated cable mode. On the earth's surface, the pulses transmitted on the modes are resolved by a compositor and compensated for the cable attenuation and propagation time as hereinbefore shown. The corresponding pulse generators $PG_1$ to $PG_6$ respond to their respective modes by producing output pulses of amplitudes that are proportional to the input from the respective attenuators (not shown). The pulse widths of the output pulses from the pulse generators, however, are equal to the time that the associated downhole gates $G_1$ through $G_6$ are enabled by the programmer 200. Each of the pulses from the group of generators $PG_1$ to $PG_6$ is combined in an output bus 204 to make up the step function wave shape shown in FIG. 9. A filter 205 smooths the steps to produce a signal on an output conductor 206 at the compositor that is almost identical to the input signal in the multiplexer input conductor 203.

In effect, the programmer and gates chop the continuous signal into pulses which are sent sequentially through modes applied to the cable. The mode signals then are combined at the surface into a smooth, continuous waveform. The advantage offered by this method is that the pulse spacing for pulses on each mode is equal to the period of the programmer while the pulse height information corresponds to the signal amplitude in the much shorter time of the particular program subinterval to which each mode corresponds. Thus, the bandwidth or rate at which information may be transmitted on the cable increases with the number of modes used and, for example, in the case of N modes of equal bandwidth or resolving time, the information rate is increased by a factor of N over the case where only one mode is used.

It will be obvious to those skilled in the art that various changes and modifications may be made therein without departing from the invention and it is, therefore, intended to cover all such changes and modifications as fall within the true spirit and scope of the invention.

In particular, while each of the embodiments shown partitions a single input channel into separate channels which are transmitted by separate modes and then recombined at the surface into a single output channel, it is obvious that the downhole gate inputs may be used for separate information channels, and the uphole pulse generator outputs need not be combined. Then all of the embodiments may be used for transmitting separate channels of pulse trains without interference or crosstalk on the cable and with less distortion and more precise time correlation of the pulses on a single channel than would be the case if mode transmission were not used. In this application the pulse resolving time for pulses on a particular channel would be the same as the resolving time of the mode by which it is transmitted.

In applications such as those in which the input channels contained continuous waveforms, the pulse generators would not be used, and the channels may be connected directly to the inputs of the downhole summing units or mode transformers and extracted at the corresponding uphole summing units or mode transformers.

Also, for digital data transmission, it would not be necessary to require that the pulse generator output be proportional to the enabling pulse. Furthermore, the attenuation but not the delay circuits could be eliminated.

What is claimed is:

1. A signal transmission system comprising a first plurality of gates, means for selectively enabling each of said gates in sequence, a multiconductor transmission line, logic means for coupling said gates to at least some of said transmission line conductors in an ordered sequence to apply unique voltage patterns to said conductors, each of said patterns being individual to a respective one of said gates, and further logic means coupled to said transmission line for establishing an output signal in response to said individual voltage patterns.

2. A signal transmission system according to claim 1 comprising delay means associated with said further logic means to compensate for the propagation characteristics of said transmission line voltage patterns.

3. A data transmission circuit comprising means for generating an input signal, a plurality of gates coupled to said input signal means, a switching circuit coupled to said input signal means and said plurality of gates for selectively enabling each of said gates in a predetermined order to pass sequential portions of said input signal therethrough, a multiconductor cable, logic means for coupling said sequential signal portions to at least some of said cable conductors in a series of conductor polarity combinations each of which is individual to a respective one of said signal portions, and further logic means coupled to and responsive to said polarity combinations to produce a signal that corresponds to said sequential signal portions.

4. A data transmission circuit according to claim 3 comprising delay means responsive to said further logic means to compensate for signal propagation differences between said conductor polarity combinations, and attenuation means associated with said further logic means to compensate for different attenuation in said cable for each of said conductor polarity combinations.

5. A pulse transmission system comprising a source of input pulses, a plurality of gating circuits, a delay circuit coupled to said source and said gating circuits for applying said input pulses to said gating circuits, a switching circuit responsive to said input pulses and coupled to each of said gating circuits in said plurality to enable each gate in sequence to pass a pulse therethrough, a multiconductor cable, logic means for coupling said passed pulses to said cable conductors in a plurality of voltage patterns each of which is individual to a respective gating circuit, another plurality of gating circuits, further logic means for applying said voltage patterns to said gating circuits to selectively enable each of said gating circuits to pass a pulse therethrough in a predetermined sequence, attenuation means coupled to the outputs of said another plurality of gating circuits to compensate for nonuniform voltage pattern transmission in said cable, and delay circuits coupled to the outputs of said another plurality of gating circuits to compensate for nonuniform signal propagation in said cable.

6. A well logging tool comprising a housing, a pulse source within said housing, a multiconductor cable connected to said housing, a plurality of gating circuits within said housing responsive to said pulse source, at least one logic circuit within said housing coupling said gating circuits to said cable conductors, and a switching circuit within said housing responsive to said pulse source for enabling each of said gates in a predetermined sequence to pass said pulses to said logic circuit for application to said cable conductors in specific polarity relationships that each are individual to a respective one of said gates.

7. A signal transmission system comprising a plurality of gate circuits, a counter for enabling each of said gates in a predetermined order, a signal generator coupled to said gates for the sequential transmission of signal portions therethrough, a multiconductor cable, a plurality of summing circuits each individual to one of said conductors and each common to all of said gates for applying said transmitted signal portions to said cable conductors in a plurality of polarity patterns that are individual to a respective gate, and another plurality of summing circuits each individual to a respective one of said voltage patterns and coupled to said conductors in order to respond to said polarity patterns therein by suppressing said signal portions except in said conductor coupled summing circuit individual to said voltage pattern.

8. A signal transmission system according to claim 7 wherein said both of said pluralities of summing circuits comprise individual transformers each having at least three windings coupled thereto.

9. A signal transmission system according to claim 7 comprising a plurality of further circuits, each of said further circuits individual to at least some of said conductor coupled summing circuits to compensate for the transmission characteristics of said cable.